H. J. MURRAY.
MOTOR TYPE OF ELECTRIC GEAR SHIFT.
APPLICATION FILED MAR. 19, 1918.
1,295,920.
Patented Mar. 4, 1919.
3 SHEETS—SHEET 1.
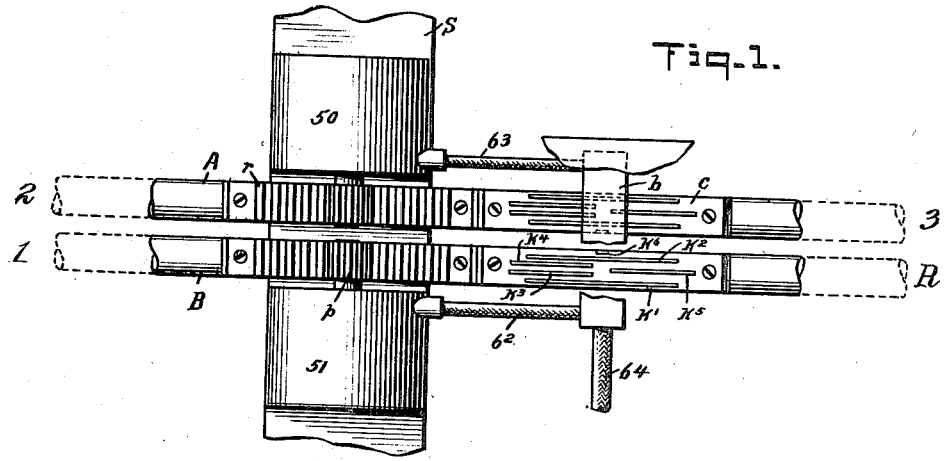
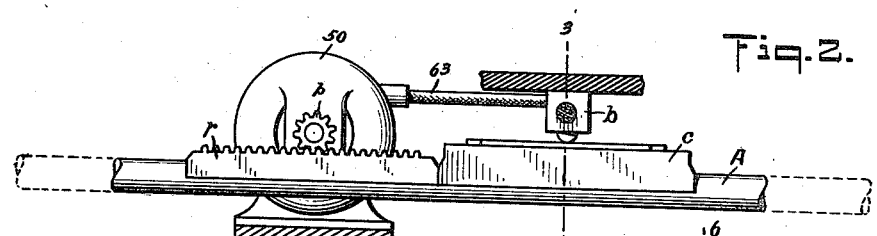
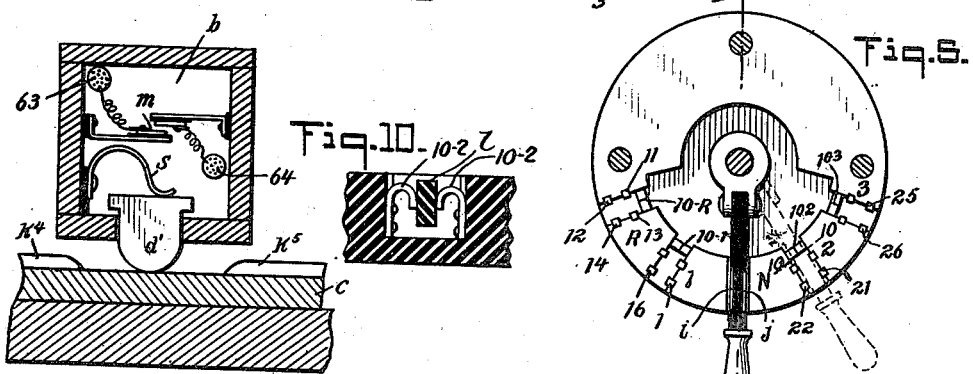
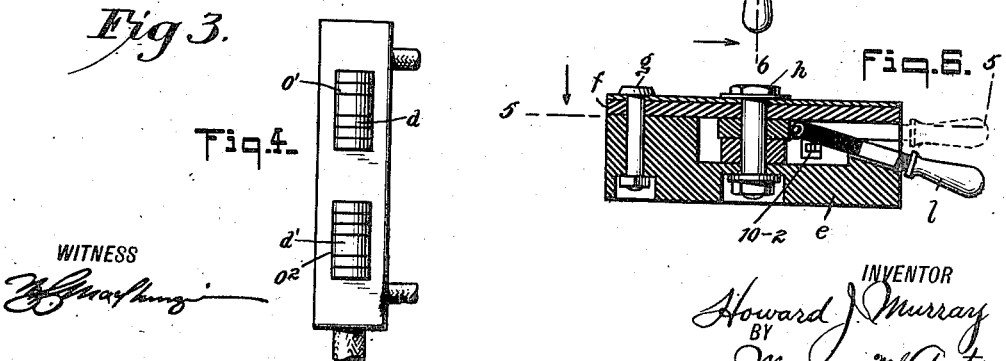
WITNESS
INVENTOR
Howard J. Murray
BY
Messmer and Austin
ATTORNEYS

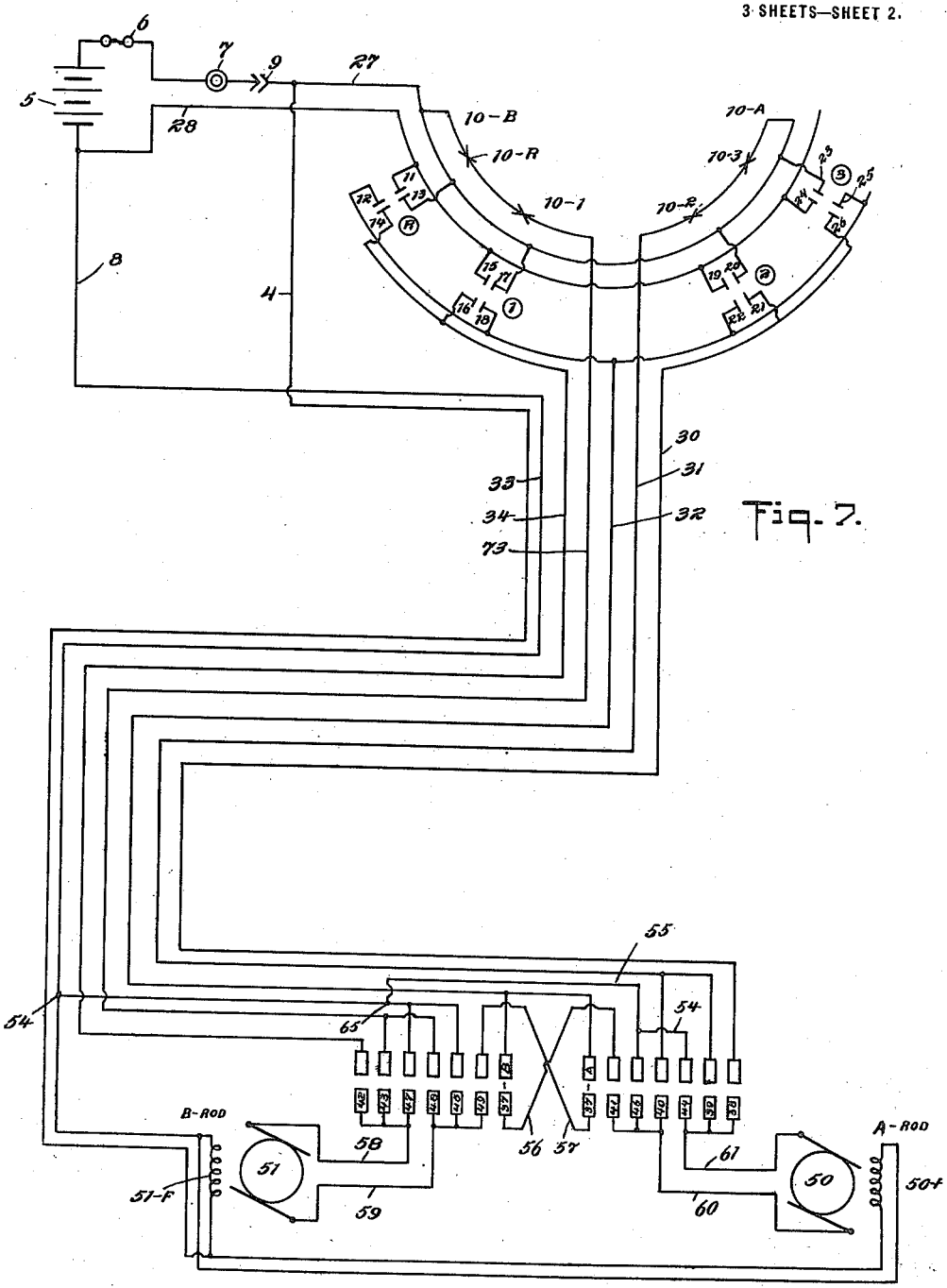

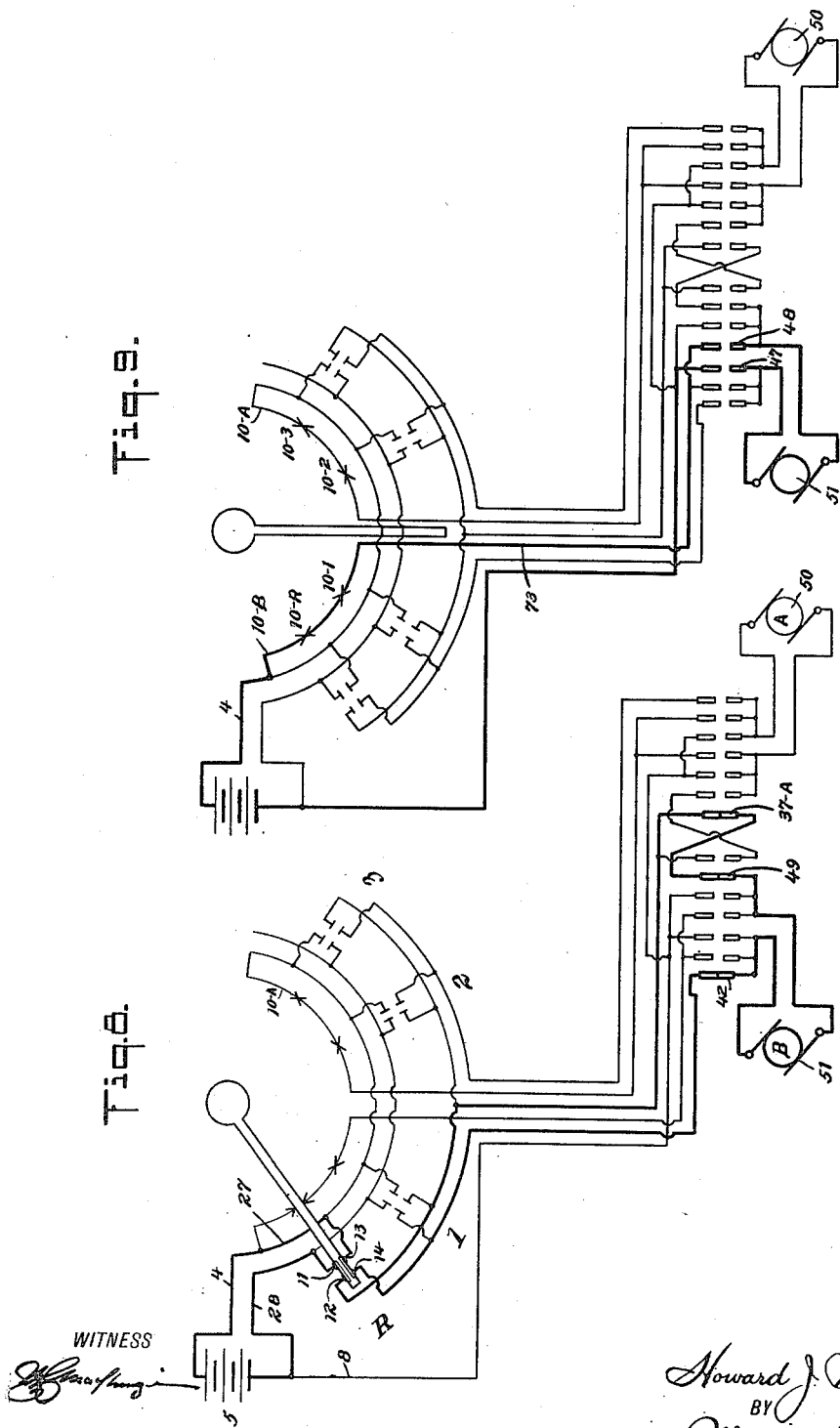

UNITED STATES PATENT OFFICE.

HOWARD J. MURRAY, OF BROOKLYN, NEW YORK.

MOTOR TYPE OF ELECTRIC GEAR-SHIFT.

1,295,920. Specification of Letters Patent. Patented Mar. 4, 1919.

Application filed March 19, 1918. Serial No. 223,297.

*To all whom it may concern:*

Be it known that I, HOWARD J. MURRAY, a citizen of the United States, and resident of the borough of Brooklyn, in the county of Kings and State of New York, have invented certain new and useful Improvements in Motor Type of Electric Gear-Shift, of which the following is a specification.

My invention relates in general to an automatically governed, safety mechanism for selectively actuating one or more devices in proper operative sequence from a single control station and specifically relates to an automatic electric gear shift and clutch control for motor vehicles.

In such devices, heretofore known, it has been necessary to utilize selective devices controlled by springs, electromagnets, and other tension creating elements for moving and holding the shifting elements in their shifted positions. Further these devices have depended upon some manual action of the operator in order to insure the positioning of the shifting members in some neutral or inoperative position before other shiftings can be effected and in all these cases force has been required to actuate the locking devices necessary in such constructions.

The primary object of my invention is to simplify these devices to provide for a positive shifting of the selected mechanism control member for using selective mechanism and to provide for positive and automatic neutralization of the shifting element. A further object of the invention is to provide a construction in which the cost of operation, manufacture and necessary repairs is reduced to a minimum and in general a positively acting and fool-proof device is provided.

I attain these objects in general first by providing a reversible motor for shifting a mechanism controlling rod in either direction to and from a neutral position and controlling the circuit to the motor by the coöperation of two circuit closers, one a manually actuated selective switch and the other a series of shifting contacts carried by the controlling rod and coacting to effect a proper sequence of movements to effect the selected shift. Further, I combine two such controlling rods and so design the two circuit closers that one of the rods can be shifted in the selected direction only when the other rod is in an inoperative position.

Among the specific objects of the invention when considered in connection with its application to a gear shifting device is to insure the quick resetting of driving gears from one into another position, such for instance as resetting a gear set from a positive drive to a reverse position.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

As the invention may be admirably embodied in a gear shifting mechanism for automobiles it will be described in connection with such a device but it will be readily appreciated that the invention is not so limited but may be utilized wherever an electrically controlled selective means is utilized to govern the coöperative actuation of different mechanical elements. In the following description and in the claims, parts will be identified by specific means for convenience of expression but they are intended to be as generic in their application to similar parts as the art will permit.

Referring to the accompanying drawings:

Figure 1 is a plan view of a portion of the motive power element of a preferred embodiment of my invention;

Fig. 2 is a view in side elevation of the device shown in Fig. 1;

Fig. 3 is a transverse sectional view taken on the lines 3—3 of Figs. 1 and 2;

Fig. 4 is a view of the underside of the circuit breaker casing shown in section in Fig. 3;

Fig. 5 is a plan view of the control switch for controlling the circuits leading through the automatic circuit breaker of Fig. 3 and with the top cover removed, so as to show the top of the switch on the plan indicated by the line 5—5 of Fig. 6;

Fig. 6 is a vertical sectional view taken axially through the switch and taken on the line 6—6 of Fig. 5;

Fig. 7 is a diagrammatic view showing the motive power element of Fig. 1, the switch element of Fig. 5 and with the electric connecting and associated parts constituting the system selected to illustrate a physical embodiment of the invention;

Fig. 8 is a portion of the showing of Fig.

7 with the circuit for moving the gear set controlling member into reverse position shown in heavy black lines; and Fig. 9 is a similar view showing the neutralizing circuit in heavy black lines.

Fig. 10 is a sectional view taken on the line 10—10 of Fig. 5.

In the drawing there is illustrated an organization of parts which include a motive element, shown in Figs. 1 to 4 inclusive and shown diagrammatically at the lower side of Fig. 7; a switch element shown in Figs. 5 and 6 and shown diagrammatically at the upper right hand side of Fig. 7. There is also shown in Fig. 7 certain auxiliary parts and the wiring for electrically connecting the elements.

Referring to Fig. 1, there is shown a pair of paralleling gear shifting rods A and B mounted for reciprocatory movement in either longitudinal direction to shift the different speed gears usually found in automobile constructions. A combination of two rods is illustrated but it is appreciated that any number of such rods may be actuated from the mechanism hereinafter described with obvious mechanical changes.

Motive element.

Each of the rods is provided with a rack $r$ continuously meshing with a pinion $p$ fixed to the armature shaft of a shunt wound reversible motor. One of the motors 50 is arranged to shift the rod A into second or third speed position and the other motor 51 is correspondingly arranged to shift the rod B into reverse or first speed position. The motors are oppositely disposed on a support S with their pinions in alinement and in juxtaposition so as to position the rods close together as required by the gear set or other mechanism actuated thereby. Each of the rods also carries a metal casing $c$ conforming to the rod in the form of a bakelite molding provided on its upper side with a series of ridges or inserts, constituting keys extending parallel to the direction of shift of the rods.

These ridges include two relatively long shifting keys $K^1$ and $K^2$ and three neutralizing keys $K^3$, $K^4$, and $K^5$ disposed between the shifting keys. The neutralizing keys are disposed with two keys $K^3$ and $K^4$ disposed side by side and extending slightly beyond the adjacent ends of the shifting keys. The third neutralizing key $K^5$ is positioned between the opposite ends of the shifting keys, also projects slightly beyond this adjacent end of the shifting keys and is offset longitudinally of the neutralizing keys $K^4$ and $K^5$ as shown in Fig. 1. A sixth relatively short key $K^6$ is positioned on the side of the commutator adjacent the other rod and is offset laterally from the other keys and positioned opposite the space between the keys $K^4$ and $K^5$. This arrangement provides six keys across the face of each armature $c$.

A circuit breaker casing $b$ (Fig. 4) is positioned to extend laterally across the neutral position of the commutator. The underside of this casing is provided with a pair of button guiding openings $O^1$ and $O^2$ positioned transversely across the normal position of the armatures. Six flat disk buttons $d$ are positioned side by side and coact to have a guiding fit in each opening. The buttons of each set are arranged to coact with the six keys of the armature beneath the same so as to be raised thereby when the ridges are shifted. In order to facilitate the lifting engagement of the keys with their corresponding buttons the ends of the keys are rounded off as shown in Fig. 3 and the engaged edges of the buttons are similarly curved. Each of the buttons is maintained in its depressed position engaging the armature or its keys by means of an inverted U-shaped spring $s$ housed within the casing and bearing upon the top of the same. The spring has one end insulated from and fastened to an inner wall of the casing and has its free end bearing on its controlling button.

The upward movement of any of the buttons acts through the spring to close a correlated pair of normally open contact members collectively identified by the character $m$. It will be noted that one of the middle buttons $d'$ is of greater width than the other buttons so that it may be lifted by the engagement therewith of any one of the two neutralizing keys. These members $m$ are spring plates also insulated from and fastened to opposite walls of the casing, and having their free ends overlapping above their respective controlling buttons as shown in Fig. 3.

Seven sets of these contact members $m$ are contained in each of the casings, one set being numbered from left to right in Fig. 7, and similarly counting from the upper to the lower side of Fig. 1, as 42, 43, 47, 48, 45, 49 and 37—B for the set controlling the motor 51 and rod B and contact members 37—A, 41, 46, 40, 44, 39 and 38 for the set controlling the motor 50 and rod A. Considering the first set of members 37—B is controlled by key $K^6$, 42 is controlled by key $K^1$; 49 is controlled by $K^2$, 43 by key $K^3$; 45 by key $K^4$ and both 47 and 48 by $K^5$ on rod B. Similarly the members 37—A, 41, 46, 40, 44, 39 and 48 are controlled by the correspondingly lettered keys on the rod A.

Switch control.

The switch element is positioned convenient to the operator and includes a pair of disk moldings including a base 2 and a cover $f$ demountably fastened together by means of bolts g. A centrally disposed bolt h constitutes a pivot for a hand actuated lever l which is formed of some non-conducting material and is provided on opposite sides with short metallic conducting plates i and j designed to connect the contacts of the series corresponding to 11, 12, 13 and 14 shown in Fig. 7. The lever is designed to be swung horizontally about its axis and to be lowered into any one of five radially disposed slots lettered from left to right in Fig. 5, R, I, N, 2, and 3 to effect a shifting of the rods A and B into the reverse, first, normal and inoperative, second or third speeds and at the same time to open either the circuit including contacts 10—R, 10—1, or to open the circuit containing the contacts 10—2 and 10—3 to effect a shifting of the rods A and B into their neutral positions as hereinafter described.

Electrical connections.

In use the elements are supplied with energy from a source of electric energy 5, from one side of which leads a field return wire 4. Positioned in the circuit between the source 5 and the wire 4 is a fuse 6, a supply switch 7 and a clutch circuit breaker 9 all of conventional design.

A common return wire 8 leads from the opposite side of the source 5. The field 50—F of the motor 50 and the field 51—F of the motor 51 are positioned across the wires 4 and 8 so as to energize the fields thus disposed in parallel. A neutralizing lead 10—A for the rod A leads from the wire and contains in its length two normally closed spring contact points, the third speed neutralizing contact 10—3 and the second speed neutralizing contact 10—2 respectively disposed in the rear portion of the slots 3 and 2. A wire 31 connects lead 10—A with members 39 and 40. Similarly a neutralizing lead 10—B for the rod B leads from the wire 4 and contains two normally closed spring contact joints, a reverse neutralizing contact 10—R and a first speed neutralizing contact 10—1 disposed respectively in the rear portion of the slots R and 1. (See Fig. 5.) A connecting wire 73 connects the lead 10—B with the members 43 and 48.

Each of the slots except slot N is provided with four contacts arranged in pairs, 11, 12 and 13, 14 for R; 15, 16 and 17, 18 for 1; 19, 20 and 21, 22 for 2 and 23, 24, 25, 26 for 3. Slot N is not provided with any contact and is merely a convenient place to position the lever when the parts are in normal position with the car running or at rest. Shunted from the wire 8 is a battery lead 28 for conveying current to the switch and which wire is connected to one contact of each set, to wit: 11, 15, 19 and 24. Shunted from the wire 4 is a battery lead 27 which is connected to the opposite contacts of each set, to wit: 13, 17, 20 and 23. A connecting wire 32 leads from contacts 12, 18, 22 and 25 to members 37—A and 37—B. A connecting wire 34 leads from contacts 14 and 16 to member 42. A connecting wire 30 leads from contacts 21 and 26 to member 38. A wire 54 connects members 44 and 46 with a wire 55 which also connects members 45 and 47 with the return wire 8. A wire 56 connects upper element of 41 with lower element of 37—B and similarly a wire 57 connects upper element of 49 with lower element of 37—B. The lower elements of members 42, 43 and 47 are connected by conductor 58 with one side of the armature of the motor 51 and the lower element of members 48, 45 and 49 are connected by conductor 59 with the other side of the motor 51.

Similarly the lower elements of members 41, 46 and 40 are connected by conductor 60 with one side of the motor 50 and the lower elements of members 44, 39 and 38 are connected by conductor 61 with the other side of the motor 50.

The several wires forming the conductors 58 and 59 are grouped in a cable 62 (Fig. 1); the several wires forming the conductors 60 and 61 are grouped in a cable 63, and the wire connecting the selective switch element with the commutator controlled switch elements are collected in a cable 64.

In operation, let it first be considered that the engine is running; the car at rest; the clutch in; the transmission at neutral and controlling switch in the "N" position shown in Fig. 5. The operator desires to start the car by throwing in first speed gear set. The control lever 7 is lifted out of the "N" position, moved horizontally to the left until it is over the slot 1 and is then lowered into the depressed position in the slot 1. This does two things. First, it separates the contact 10—1, thus opening the neutralizing circuit hereinafter described and completes the circuit through the contact 15, 16, 17, 18 to supply current to the motor 51 in such a way as to obtain the desired shift into first speed position. The clutch switch 9 may have been thrown out before the lever is pushed into first position or it may be closed after this lever is pushed into first position or it may be closed after this lever is lowered. With the lever in its lowered position and the clutch "out" current will be supplied to the motor 51 and the pinion thereof will move the rack r to the left of Fig. 1. The rod will continue to be moved to the left, current being supplied to the motor 51 as long as the shifting keys $K^1$ and $K^2$ are in position to raise the correlated controlling member m. As the rod B moves into its final shifted position, the keys $K^1$ and $K^2$ slide from under their correlated buttons which then drop thus permitting the members forming the members 42 and 49 to separate and thus intercept the shifting current to the motor 51. As the key K⁵ is longer than the keys K¹ and K² it will maintain the members 47 and 48 in circuit closing position to reverse the direction of rotation of the motor 51 after the rod B has been shifted to its first speed position.

Let it be assumed that either intentionally or accidentally, the lever is raised from its depressed position in slot 1, then the shifting contact will be broken and the neutralizing circuit reëstablished by the closing of the contact 10—1. This closes the circuit to the motor as far as the control switch is concerned and current will be reversed through the motor 51 through the closed contacts 47 and 48 and the rod "B" will be moved to the right until the contacts are again opened by the button sliding off the key K⁵.

Assume that the operator is turning the car around in a narrow street and desires to shift from first to reverse several times. The control rod is lifted out of the first position; the neutralizing contact 10—1 is again closed as described, and current is supplied (if the clutch is "out") to the motor through the contacts 47 and 48. This circuit is shown in heavy lines in Fig. 9 and may be traced through the first combination in the following table.

|  | Lever. |  |  | Field. |
|---|---|---|---|---|
| Rod B: |  |  |  |  |
| 1. Neutral to reverse. | In (R) | 5—6—7—9—27—13—14—34—42—58—51—59—49—(37—A)—32—12—11—28—5 | 10—R open | 5—6—7—9—4—(51—F)—33—8—5 |
| 2. Reverse to neutral. | Up | 5—6—7—9—27—(10—B)—(10—R)—(10—1)—73—48—59—51—58—47—33—8—5 | 10—R closed | " |
| 3. Neutral to 1st | In (1) | 5—6—7—9—27—17—18—32—(37—A)—49—59—51—58—42—34—16—15—28—5 | 10—1 open | " |
| 4. 1st to neutral | Up | 5—6—7—9—27—(10—B)—(10—R)—10—1)—73—43—58—51—49—45—54—33—8—5 | 10—1 closed | " |
| Rod A: |  |  |  | 5—6—27—7—9—4—(50—F)—33 (8—5) |
| 5. Neutral to 2nd | In (2) | 5—6—7—9—27—20—21—30—38—61—50—60—41—(37—B)—32—22—19—28—5 | 10—2 open |  |
| 6. 2nd to neutral | Up | 5—6—7—9—27—(10—A)—(10—3)—(10—2)—31—39—61—50—60—46—55—33—8—5 | 10—2 closed | " |
| 7. Neutral to 3d | In (3) | 5—6—7—9—10—A—23—25—32—(37—B)—41—60—50—61—38—30—26—24—28—5 | 10—3 open | " |
| 8. 3rd to neutral | Up | 5—6—7—9—(10—A)—(10—3)—(10—2)—31—40—60—50—61—44—54—55—33—8—5 | 10—3 closed | " |
| Rod B to A: |  |  |  |  |
| 9. 1st to 2nd | (1 to 2) | Combination of 4—5 in proper sequence. |  |  |
| 10. 1st to 3rd | (1 to 3) | " 4—7 " " " |  |  |
| Rod A to B: |  |  |  |  |
| 11. 2nd to 1st | (2 to 1) | " 6—3 " " " |  |  |
| 12. 3rd to 1st | (3 to 1) | " 8—3 " " " |  |  |
| 13. 2nd to reverse | (2 to R) | " 6—1 " " " |  |  |
| 14. 3rd to reverse | (3 to R) | " 8—1 " " " |  |  |
| Same rod: |  |  |  |  |
| 16. 1st to reverse | (1 to R) | " 4—1 " " " |  |  |
| 17. Reverse to 1st | (R to 1) | " 2—3 " " " |  |  |
| 18. 2nd to 3rd | (2 to 3) | " 6—7 " " " |  |  |
| 19. 3rd to 2nd | (3 to 2) | " 8—5 " " " |  |  |

This closing of the neutralizing circuit will cause the rod B to shift to the right until the rod moves the key K⁵ from beneath the buttons controlling the members 47 and 48 which will occur as the rod reaches its neutral position, thus automatically intercepting the current to the motor. Should the momentum of the motor carry the rod over its neutral point then the keys K³ K⁴ closes contact through members 43 and 45 and current will be supplied to the motor in the reverse direction. This will not only have a breaking effect but will tend to reset the rod in neutral position.

It will be noted that the motor 51 which operates rod B could not operate if rod A was not at "neutral" as its current has to flow through contacts 37A which is open when rod A is not at neutral. However, both rods can be neutralized at any instant. It is not necessary for the operator to wait for the rod to be neutralized and may make a quick movement from position "1" to position R. The only effect of this action is to change the current supply to the motor 51 from the contact members 47 and 48 to the contact members 42 and 49. Therefore the motor 51 continues to revolve in the same direction, and the rod B moves from the extreme left to the extreme right. In other words the device automatically neutralizes and shifts with one action of the control lever.

In shifting from "R" to —1—, again, the operator merely lifts the control lever from "R" position and pushes it down into "1" position. This action allows the 10—R neutralizing circuit to close and if the clutch switch 9 is closed that is the clutch is out, current will be supplied first to the contact members 43 and 45 and then to contact members 42 and 49 and the motor moves the shift rod B from the extreme right to the extreme left position and the gear sets from the first position is in mesh again. This insures a rapid shifting of the gear set and in fact the rapidity of movement is only controlled by the capacity of the motors as any desired ratio can be used between pinion and rack and the speed of shifting may also be controlled by varying the size of the pinions.

Suppose that it is desired to shift from first to second speed position. The lever is lifted out of slot "1" moved horizontally to the right past "N" position and is pushed down in the "2" position.

This involves an interlocking movement of both rods. As the lever is lifted out of the "1" position the neutralizing contacts 10—1 are closed and current supplied to motor 51 to neutralize rod "B." Perhaps the operation has not waited for rod B to neutralize but pushes the lever into the "2" position. However, current will not be supplied to the motor 50 as contact 37—B is not in conducting position until rod B has reached its neutral position. When rod B is in this position the circuit to the motor 50 will be closed through contacts 37—B, 38 and 41 and rod A will be moved to the left. As the rod moves into second position the keys K¹ and K² on rod A will release the contacts 38 and 41 and current will be cut off from the motor 50.

It is obvious that the shifting from "2" to "3" is similar to shifting from "1" to "R."

In general it will be noted that the rods automatically neutralize themselves and no rod can be shifted until the other is at neutral and the clutch "out" and this also applied to each rod as it must pass through neutral in passing from one operative position to the other. It is impossible to make a mistake such as simultaneously making two shifts or by accidentally knocking the control lever out of position. The only possible effect of displacing the lever is to cause a neutralizing of the rods.

The device provides for preselection for should the car be running say on third speed and at some distance ahead first speed is desired. The lever is lifted out of the "3" position and pushed into "1" position but nothing will happen until the clutch is pushed "out." When it is desired to shift, the operator simply throws "out" the clutch and first speed is automatically secured without any necessity of the operator removing his hands from the steering gear.

Hand shifting may be resorted to as usual, the motor armature merely revolving idly with the movement of the rods. The device disclosed provides for positive neutralization, preselection, interlocking, independent sources of power and automatic neutralization.

I claim—

1. In a device of the class described, the combination of a mechanism control member, a reversible direct-current shunt wound motor operatively connected to the member to shift the same over a definite distance from a neutral into a mechanism-operating position, a single source of electric energy conducting means for connecting the motor field electrically with the source, a manually actuated switch in said conducting means for controlling the currents to the motor, a control switch having a circuit closing position for electrically connecting the source with the armature of the motor thereby to cause the motor to shift the member from its neutral into its operating position.

2. In a device of the class described, the combination of a mechanism control member, a reversible direct-current shunt wound motor operatively connected to the member to shift the same over a definite distance from a neutral into a mechanism-operating position, a single source of electric energy conducting means for connecting the motor field electrically with the source, a manually actuated switch in said conducting means for controlling the currents to the motor, a control switch having two circuit closing positions and a control lever, said lever in one position causing the current to pass through the motor armature in one direction to shift the member from its neutral to its mechanism operating position and in its other position causing the current to pass through the motor armature to shift the member from its mechanism operating position toward its neutral position.

3. In a device of the class described, the combination of a mechanism shifting member, a reversible motor operatively connected to said member to shift the same to and from a neutral position, a source of electric energy, a two-point control switch for connecting said source with said motor, said switch in one position connecting the motor to move the member from its normal into its shifted position and in its other position connecting the motor to return the member and a single manually actuated lever constituting the control member of said switch.

4. In a device of the class described, the combination of a mechanism shifting member having two operative positions and an inoperative position, a reversible motor constantly connected to the member and adapted to move the same from the inoperative into either of the operative positions depending upon the direction of rotation of the motor and to move the same from either of the operative into the inoperative position, a source of electric energy, a single manually actuated control switch for directing the current selectively through said motor to control the direction of rotation thereof.

5. In a device of the class described, the combination with a reversible motor, a mechanism control member actuated thereby, a source of electric energy, selective means for connecting the motor electrically with said source, said means including two sets of conductors, one set connected for causing the motor to move in one direction and the other set connected for causing the motor to move in the reverse direction when the current is passed therethrough, a single control switch having two circuit closing positions, one position controlling the current through the first named set of conductors to move said member in one direction and the other position controlling the current through the other set of conductors to return said member to its normal position.

6. In a device of the class described, the combination of a reversible motor, a mechanism control member operatively connected to the motor to shift the member from a neutral into a mechanism operating position and reverse depending upon the direction of the current through the motor, two circuit closers arranged in series coacting to control the direction of the current through the motor, one of said circuit closers operatively controlled by the position of the mechanism control member and the other circuit closer constituting a manually actuated two-position control switch, said switch in one position coacting with the armature to cause the current to traverse the motor in one direction, said armature including means for breaking said current on its final movement into its shifted position, and said switch in its second position coacting with said shifted armature to cause the current to traverse the motor in a reverse direction thereby to return the member and armature to its neutral position.

7. In a device of the class described, the combination of a reversible motor, a mechanism control member operatively connected to the motor to shift the member from a neutral into a mechanism operating position and reverse depending upon the direction of the current through the motor, two circuit closers arranged in series coacting to control the direction of the current through the motor, one of said circuit closers operatively connected to said member to be controlled by the shifted position thereof, and the other circuit closer constituting a two-position manually controlled switch, means controlled by one position of the switch for directing the current through the motor to shift the member from a neutral into a shifted position and said switch in its other position coacting with the first named circuit closer for directing the current in a reverse direction thereby to return the member to its neutral position.

8. In a device of the class described, the combination of a reversible motor, a mechanism control member operatively connected to the motor to shift the member from a neutral into a mechanism operating position and reverse depending upon the direction of the current through the motor, two circuit closers arranged in series coacting to control the direction of the current through the motor, one of said circuit closers including a plurality of contacts controlled by the shifting of said member, one of said contacts arranged to cause the current to pass through the motor in one direction and another contact arranged to cause the current to pass through the motor in the reverse direction, and the other circuit closer constituting a manually controlled switch for selectively directing the current through either of the shifting member-controlled contacts.

9. In a device of the class described, the combination of a reversible motor, a mechanism control member operatively connected to the motor to shift the member from a neutral into a mechanism operating position and reverse, depending on the direction of the current through the motor, a two position control switch operatively connected to the motor and having a lever in one position closing the circuit through the motor in a direction to move the member from its neutral into its mechanism-operating position, a commutator controlled by the movement of the member into its operating position for intercepting the direct current through the motor, and said commutator including circuit governing means controlled by the member moving into its mechanism operating position for connecting the switch with the motor to cause the current to traverse the motor in a reverse direction when the lever is moved into its second position, and said lever when moved into said second position causing current to pass through said motor to move the member from its mechanism operating into its neutral position.

10. In a device of the class described, the combination of a reversible motor, a mechanism control member operatively connected to the motor to shift the member from a neutral into a mechanism operating position and reverse, depending upon the direction of the current through the motor, two circuit closers arranged in series coacting to control the direction of the current through the motor, motor control means for directing current through the motor to shift the member from a neutral into a shifted position, said means including mechanism controlled by the movement of the member into shifted position to intercept the current in neutral to shifted position movement and said motor control means including mechanism for directing current through the motor to return the member from its shifted into its neutral position.

11. In a device of the class described, the combination of a mechanism shifting member having two operative positions and an inoperative position, a reversible motor constantly connected to the member and adapted to move the same from the inoperative into either of the operative positions depending upon the direction of rotation of the motor and to move the same from either of the operative into the inoperative position, a source of electric energy, a control switch for directing the current selectively through said motor to control the direction of rotation thereof and means controlled by the position of said member for intercepting the current flow through said motor.

12. In a device of the class described, the combination of a mechanism shifting member having two operative positions and an inoperative position, a reversible motor constantly connected to the member and adapted to move the same from the inoperative into either of the operative positions depending upon the direction of rotation of the motor and to move the same from either of the operative into the inoperative position, a source of electric energy, a control switch for directing the current selectively through said motor to control the direction of rotation thereof and means controlled by the position of said member for reversing the current flow through said motor.

13. In a device of the class described, the combination with a reversible motor, a mechanism control member actuated thereby, a source of electric energy, selective means for connecting the motor electrically with said source, said means including two sets of conductors, one set connected for causing the motor to move in one direction and the other set connected for causing the motor to move in the reverse direction when the current is passed therethrough, a single control switch having two circuit closing positions, one position controlling the current through the first named set of conductors to move said member in one direction and the other position controlling the current through the other set of conductors to return said member to its normal position, one of said conductors including a circuit breaker controlled by the position of said member when shifted by the motor.

14. In a device of the class described, the combination with a reversible motor, a mechanism control member actuated thereby, a source of electric energy, selective means for connecting the motor electrically with said source to shift the control member in either one of two directions and a current breaker controlled by the shifted member for intercepting the current through the motor.

15. In a device of the class described, the combination with a reversible motor, a mechanism control member actuated thereby, a source of electric energy, selective means for connecting the motor electrically with said source to shift the control member in either one of two directions and a current breaker controlled by the shifted member for reversing the motor.

16. In a device of the class described, the combination of two mechanism controlling members each provided with an electric motor for shifting the same from a neutral into an operative position, a source of electric energy for actuating said motors, a circuit including three circuit closers adapted when all three are in circuit closing position to connect the source electrically with one of said motors, one of said circuit closers comprising a manually actuated control switch, another of the circuit closers controlled by that mechanism controlling member actuated by the motor to be energized and the third circuit closer operatively connected to the other mechanism controlling member and disposed in circuit closing position only when said other member is in its neutral position and said third circuit closer movable into circuit breaking position by the movement of said other member away from its neutral position.

17. In a device of the class described, the combination of two mechanism controlling members each adapted to be shifted from a neutral position, a motor for actuating one of said members, a source of electric energy and a circuit for connecting the motor electrically with said source, thereby to move the motor actuated member from its neutral position, said circuit including a switch controlled by the position of the other member, closing said circuit when said other member is in its neutral position and opening said circuit when said other member is displaced from its neutral position.

18. In a device of the class described, the combination of two mechanism controlling members each adapted to be shifted from a neutral position, a motor for actuating one of said members, a source of electric energy and a circuit for connecting the motor electrically with said source thereby to move the motor actuated member from its neutral position, said circuit including a switch controlled by the position of the other member, closing said circuit when said other member is in its neutral position and opening said circuit when said other member is displaced from its neutral position and means for moving said other member into its neutral position.

19. In a device of the class described, the combination of two mechanism controlling members each adapted to be shifted from a neutral position, a motor for actuating one of said members, a source of electric energy and a circuit for connecting the motor electrically with said source, thereby to move the motor actuated member from its neutral position, said circuit including a switch controlled by the position of the other member, closing said circuit when said other member is in its neutral position and opening said circuit when said other member is displaced from its neutral position and a second motor operatively connected to said other member for returning the same to its neutral position.

20. In a device of the class described, the combination of two mechanism controlling members each adapted to be shifted from a neutral position, a motor for actuating one of said members, a source of electric energy and a circuit for connecting the motor electrically with said source, thereby to move the motor actuated member from its neutral position, said circuit including a switch controlled by the position of the other member, closing said circuit when said other member is in its neutral position and opening said circuit when said other member is displaced from its neutral position and a second motor operatively connected to said other member for returning the same to its neutral position and a single manually controlled switch for selectively closing the circuit through either motor.

21. In a device of the class described, the combination of two mechanism controlling members, electrical mechanism for shifting said members from a neutral position, a source of electric energy, means for selectively connecting either of said mechanisms with said source, said means including a pair of circuit closers operatively connected to the members to be controlled by the movement thereof and each closing the circuit to the mechanism actuating the other member when the first named member is in neutral position and each breaking the circuit to the mechanism actuating the other member when the first named member is displaced from its neutral position.

22. In a device of the class described, the combination of two mechanism controlling members, electrical mechanism for shifting said members from a neutral position, a source of electric energy and a conducting means for connecting said source with said mechanism, said conducting means including a circuit closer controlled by the position of one of the members for controlling the circuit to the mechanism for shifting the other member.

23. In a device of the class described, a pair of motors, mechanism controlling members shifted by said motors, a source of electric energy for actuating said motors, a circuit closer actuated by one of said members, conducting means for connecting said source with the motor for shifting the other member, said conducting means including said circuit closer whereby the shifting of the first named member controls the current to said other mechanism.

24. In a device of the class described, a pair of mechanism controlling reversible motors, mechanism controlled by said motors, and each movable thereby in either direction from neutral positions, and means controlled by the position of one of the mechanisms in its neutral position for energizing the motor controlling the other mechanism.

25. In a device of the class described, a pair of mechanism controlling reversible motors, mechanism controlled by said motors, and each movable thereby in either direction from neutral positions, means controlled by the position of one of the mechanisms in its neutral position for energizing the motor controlling the other mechanism and a manually actuated switch for selectively controlling the direction of the current through said energized motor.

26. In a device of the class described, the combination of a reversible motor, a rod geared thereto and shiftable thereby in either direction from a neutral position, a switch for selectively controlling the direction of rotation of the motor, a second switch for controlling another circuit and means carried by said rod for closing said other circuit when said rod is in neutral position and for breaking said other circuit when the rod is displaced from its neutral position.

27. In a gear shifting device, the combination of a plurality of gear shifting members, electrically actuated mechanism for moving said members from neutral positions into gear shifting positions, a manually actuated control for selectively energizing said mechanism to effect a desired shift of one of the members, said mechanism including means controlled by any position of the members, except the neutral position, for causing said control to be inoperative.

28. In a gear shifting device, the combination of a plurality of gear shifting members, electrically actuated mechanism for moving said members from neutral positions into gear shifting positions, a manually actuated control for selectively energizing said mechanism to effect a desired shift of one of the members, said mechanism including means controlled by any position of the members, except the neutral position, for causing said control to be inoperative and controlled by the position of said members when in neutral position for permitting the actuation of said control.

29. In a gear shifting device, the combination of a plurality of gear shifting members, electrically actuated mechanism for shifting said members and selective control means for said mechanism, said means being operatively dependent upon the position of said shifting members.

30. In a device of the class described, the combination of a plurality of motors, a source of electric energy for said motors, electric conductors for connecting said source with said motors, said conductors including in circuit two circuit closers, one of said circuit closers constituting a selective switch for connecting the source with one of the motors while breaking the connection with the other motor, and said second circuit closer controlling the current to the selective switch, whereby the motor to be actuated can be preselected and energized simply by "throwing in" said last named switch.

31. In a gear shifting device, the combination of two gear controlling members, each member provided with a reversible motor for shifting the same in either direction, a source of electric energy, means for connecting said motors electrically with said source, said means including two circuit closers disposed in series, one of said circuit closers constituting a manually actuated switch for preselectively connecting the source with one of the motors to cause the same to rotate in the direction to effect the desired shift of one of the controlling members, and the other circuit closer adapted to be connected to a clutch so that the throwing out of the clutch will close the circuit through the preset selective switch thereby to effect the desired shift through the actuation of the clutch.

32. In a device of the class described, the combination of a mechanism control member movable in either direction from a neutral position, a reversible motor operatively connected to the member to shift the same in either of its directions to and from normal, means for connecting said motor with a source of electric energy, said means including two circuit closers, one of said circuit closers being operatively actuated by the position of said member when displaced from its neutral position in one direction and the other circuit closer being actuated by the position of the member when displaced from its neutral position in the other direction, both circuit closers connected to the motor to cause the motor to rotate in that direction which will return the member to its normal position and both of said circuit closers being inoperative when the member is in its neutral position.

33. In a device of the class described, the combination of a mechanism control member movable in either direction from a neutral position, a reversible motor operatively connected to said member to shift the same, means for connecting the motor electrically with a source of electric energy, said means including a circuit closer actuated by the member when displaced in one direction from its neutral position for closing the circuit through the motor in a direction to effect a movement of the member toward its neutral position and said member being free to travel past said neutral position.

34. In a device of the class described, the combination of a mechanism control member movable in either direction from a neutral position, a reversible motor operatively connected to said member to shift the same, means for connecting the motor electrically with a source of electric energy, said means including a circuit closer actuated by the member when displaced in one direction from its neutral position for closing the circuit through the motor in a direction to effect a movement of the member toward its neutral position and said member being free to travel past said neutral position, said circuit closer provided with means for intercepting the current to the motor as the member approaches its neutral position whereby the motor will be caused to act as an electric brake for the member.

35. In a device of the class described, the combination of a mechanism control member, having a normal position and movable in both directions from said normal position, shifting means controlled by said member when displaced from its normal position in one direction to move the same toward said neutral position, said member being free to move under its inertia past said neutral position and manually controlled means coacting with said shifting means to move said member positively beyond said neutral position into a position displaced from its normal position in the direction therefrom opposite the first named direction.

36. In a device of the class described, the combination of a mechanism control member having a normal position and movable in both directions from said normal position, a reversible motor operatively connected to said member to shift the same, means controlled by the position of said member offset in one direction from its normal position for causing said motor to rotate in the direction to move said member toward its normal position, said member being free to move under its inertia past said normal position and manually actuated means adapted to be set to cause the motor to continue to rotate in the direction to continue the movement of said member beyond its normal position.

37. In a device of the class described, the combination of a mechanism control member having a normal position and movable in both directions from said normal position, a reversible motor operatively connected to said member to shift the same, means controlled by the position of said member offset in one direction from its normal position for causing said motor to rotate in the direction to move said member toward its normal position, said member being free to move under its inertia past said normal position and manually actuated means adapted to be set to cause the motor to reverse its direction of rotation automatically should the member pass its normal position.

38. In a device of the class described, the combination of a mechanism control member having a normal position and movable in both directions from said normal position, a reversible motor operatively connected to said member to shift the same, means forming a plurality of circuits connected electrically to said motor for controlling the direction of rotation thereof, circuit closers for controlling said circuits, and means carried by the member into positions to act on said circuit closers to control the closing of their circuits.

39. In a device of the class described, the combination of a mechanism control member having a normal position and movable in both directions from said normal position, a reversible motor operatively connected to said member to shift the same, means controlled by the position of said member offset in one direction from its normal position for causing said motor to rotate in the direction to move said member toward its normal position, said member being free to move under its inertia past said normal position and selective manually actuated means coacting with said member to cause the motor either to continue to rotate in its direction for moving the member toward its normal position or to cause the motor to reverse its direction of rotation as the member passes its normal position.

Signed at New York city in the county of New York and State of New York this 8th day of March A. D. 1918.

HOWARD J. MURRAY